Jan. 24, 1967  R. FELDMAN  3,300,139
THERMAL-STRUCTURAL SYSTEM
Filed Oct. 26, 1964  3 Sheets-Sheet 1
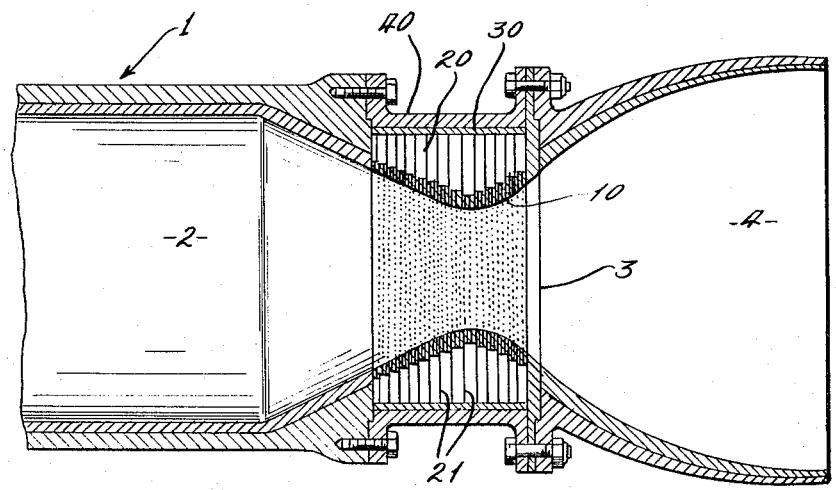
FIG.1
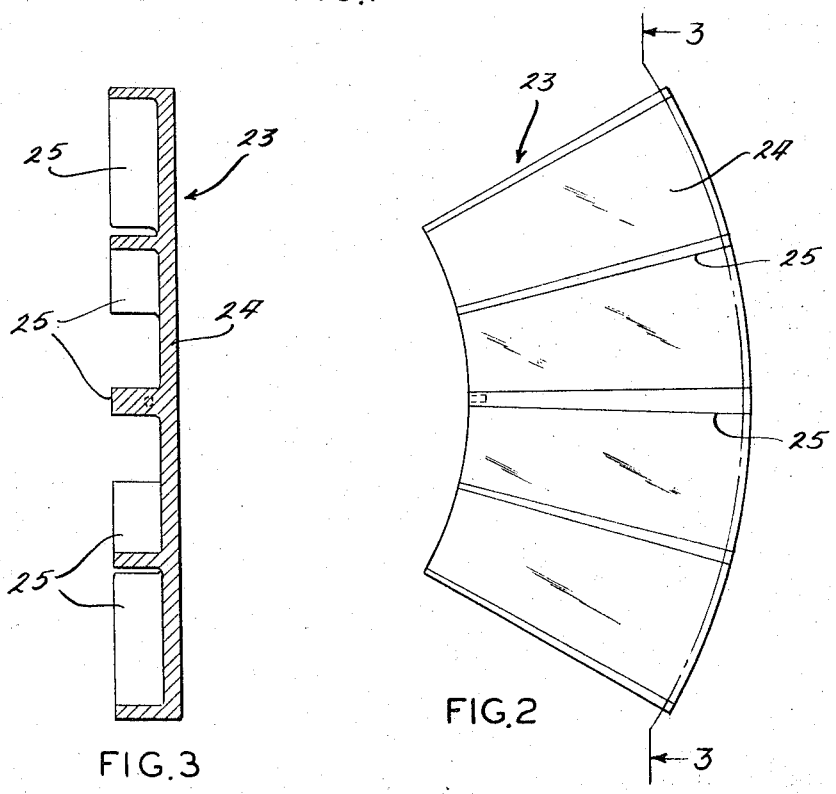
FIG.2
FIG.3
INVENTOR
RUBIN FELDMAN
BY
ATTORNEY.

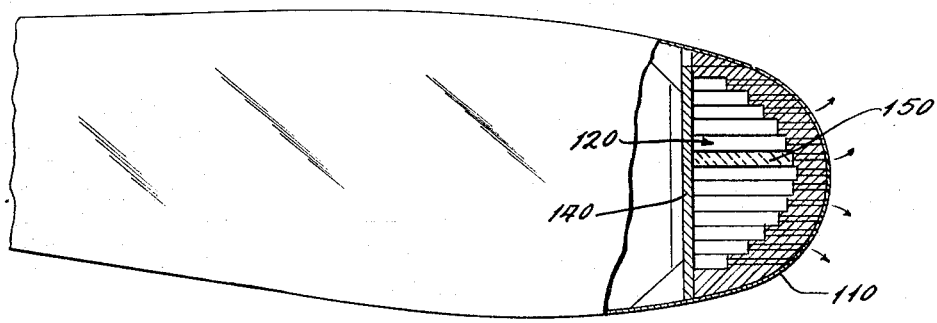
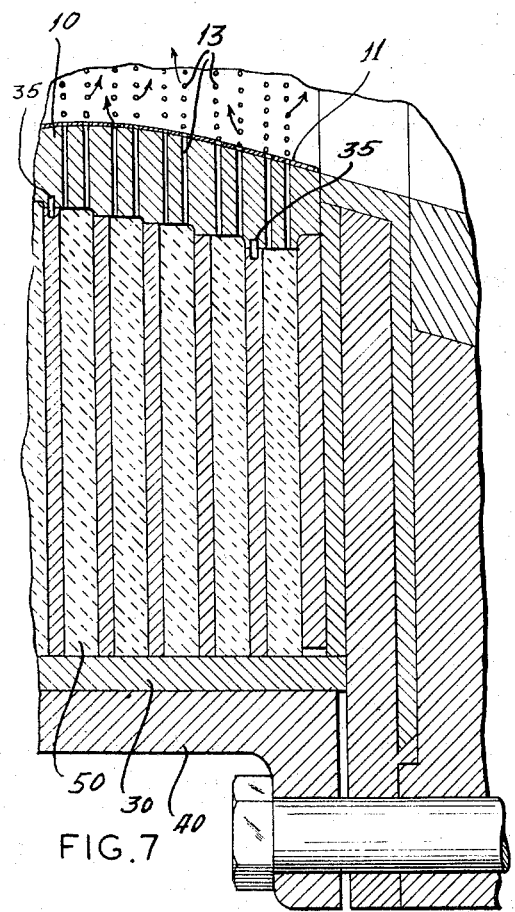
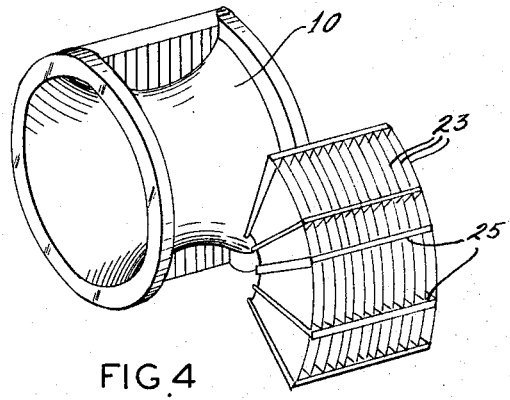
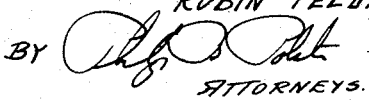

Jan. 24, 1967  R. FELDMAN  3,300,139
THERMAL-STRUCTURAL SYSTEM
Filed Oct. 26, 1964  3 Sheets-Sheet 3

INVENTOR:
RUBIN FELDMAN
BY
ATTORNEY

United States Patent Office 3,300,139
Patented Jan. 24, 1967

3,300,139
THERMAL-STRUCTURAL SYSTEM
Rubin Feldman, Creve Coeur, Mo., assignor to Emerson Electric Co., St. Louis, Mo., a corporation of Missouri
Filed Oct. 26, 1964, Ser. No. 406,280
8 Claims. (Cl. 239—127.3)

This invention relates to thermal-structural systems illustrated by certain rocket nozzles, combustion chambers of propellent systems, aerodynamic surfaces subject to hyperthermal environments and the like. The invention will be described as applied to rocket nozzles, but the application of the invention is broader, and the description in terms of rocket nozzles is merely illustrative.

The temperatures at which rocket nozzles, for example, must operate, and the erosive conditions to which they are subjected, make it imperative to cool them. In liquid propulsion systems, this may be accomplished by using some of the liquid itself as a coolant. However, this is not possible in a solid propellent system and is frequently difficult or impossible to accomplish in a liquid system. In solid systems it has been common heretofore to provide heat sinks, or to tolerate the change in geometry of the rocket nozzles in operation. This has been less a factor than it might sound because the burning times of the solid propellent systems have been very short. For prolonged burning times, or repeated reignition, the nozzle systems now commonly in use, particularly those used with solid propellants, are inadequate. Systems have been proposed utilizing sublimating or "gasifying" compositions to provide protection in several ways: through the heat of sublimation or gasification; through transpiration cooling; through formation of boundary layers of gas, and through decomposition of the gaseous material. Feldman, U.S. Patent No. 3,022,190, suggests the impregnation of porous metal or ceramic shapes with a sublimate, and coating the "no-flame" side with a gas-impervious backing. However, the amount of sublimate which can be contained in such a matrix is generally not sufficient to provide long-sustained thermal protection under extreme conditions such as in a rocket nozzle application. Scully et al., No. 3,014,353 and Rice, No. 2,941,759, suggest the use of a honeycomb or trough-like reservoir of sublimating or gasifying material, faced with a gas-pervious skin. This arrangement provides a sufficient quantity of material for extended protection but it has had a practical defect which the present invention overcomes.

One of the objects of this invention is to provide a thermal-structural system utilizing a thermal element in the nature of sublimating compositions, in which the geometry of the system remains substantially constant in use.

Another object is to provide such a system in which the structural elements serve to maintain the geometry of the system, support the sublimating thermal elements, ensure the proper distribution of heat to the thermal elements, direct gaseous sublimate where it is needed and provide a transpiration and decomposition medium for the gaseous sublimate.

Still another object of this invention is to provide such a thermal-structural system which is light in weight, simple, effective, and in which elements can be made replaceable.

Still another object is to provide such a system which is self-regulating and capable of intermittent operation.

Other objects will become apparent to those skilled in the art in the light of the following description and accompanying drawing.

In accordance with this invention, generally stated, a thermal-structural system is provided in which, preferably sublimating, but under some circumstances other solid gasifying composition in a thermally conductive matrix is carried by a cellular structure (skeleton) of heat conductive material, backed with an impervious, gas directing and load-carrying structure and faced with a gas-pervious porous or foraminous heat and erosion resistant facing or liner structure. The cells of the cellular structure communicate with the gas-pervious liner.

The sublimates or gasifying compositions which comprise the thermal elements of the structure of this invention not only provide a heat sink in their sublimation or gasification, but are such that the gaseous products decompose endothermically. It is essential that the sublimates or gasifying compositions be carried in a matrix of heat conductive material which is substantially stable dimensionally under the conditions of use to which it is subjected.

The porous or foraminous liner serves as a heat exchange medium. Gases transpiring through the liner decompose to produce a heat absorbing capacity, among the illustrative sublimates set forth in the description below, of as much as 6,000 B.t.u. per pound. In addition, the liner is protected by the effects of mass injection, and the expansion of the layer by the introduction of gases to it through the liner. Additionally, the endothermic decomposing within the boundary layer of sublimate gases cools the liner downstream from their locus of injection. This protection permits the system to be operated continuously with the liner at its maximum permissible temperature. This in turn, provides the most effective re-radiation and provides the least temperature gradient between the surface of the liner and combustion products in the case of a rocket nozzle, or the ambient atmosphere in certain other applications.

One of the advantages of the system of this invention is the ease with which the elements may be assembled. For example, in a rocket nozzle, the liner can be made to the desired geometrical shape, separately from the other elements. The skeleton, filled with sublimating composition in its matrix, can then be mounted on the liner in segments, with graphite slips between segments to give a floating seal. This segmented arrangement not only makes for ready mounting, but provides a means for relieving hoop stresses which would otherwise tend to crack the skeleton and the liner itself. It also permits the replacement of the skeleton. A cushioning and sealing blanket can be interposed between the mounted skeleton and the back-up load-carrying structure.

In the drawing,

FIGURE 1 is a longitudinal sectional view of a rocket nozzle equipped with one embodiment of thermal-structural system of this invention;

FIGURE 2 is a view in side elevation of a segment of skeleton of the thermal-structural system of FIGURE 1;

FIGURE 3 is a sectional view, taken along the line 3—3 of FIGURE 2;

FIGURE 4 is a somewhat schematic view in perspective, partly exploded, of a liner and sections of skeleton of the nozzle shown in FIGURE 1;

FIGURE 7 is an enlarged fragmentary sectional view of the nozzle shown in FIGURE 1, showing a part of the skeleton filled with gasifying material at the beginning of its operation; and FIGURE 8 is a somewhat schematic view in side elevation, partly broken away, showing the use of the thermal structural system in an aerodynamic surface.

Figure 6:
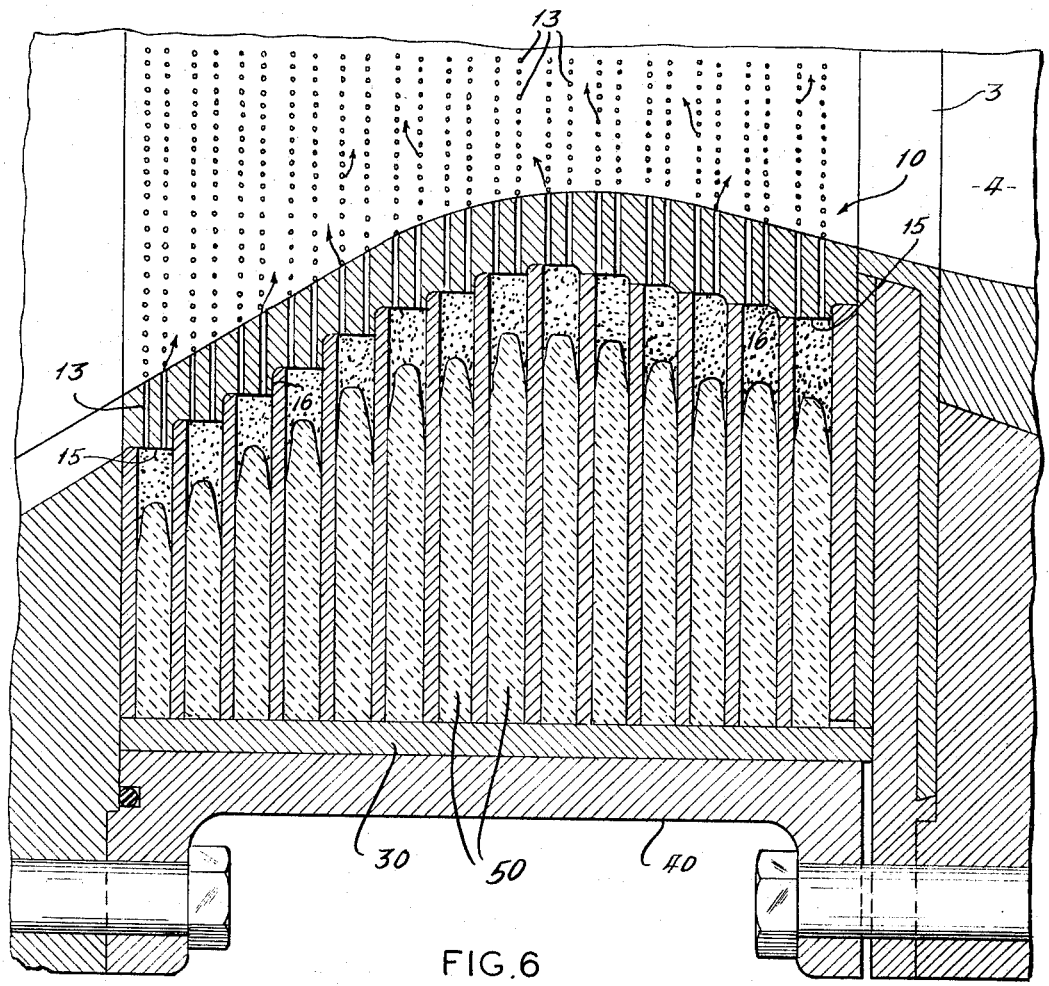
FIGURE 6 is an enlarged fragmentary sectional view of the nozzle shown in FIGURE 1 in use showing gasifying composition in the process of being consumed and matrix material remaining.
Figure 5:
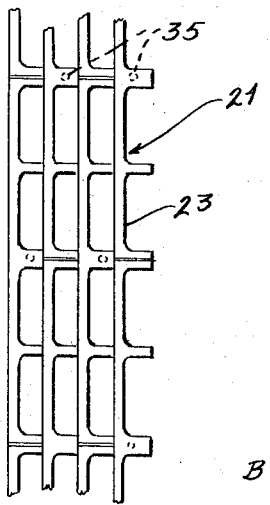
FIGURE 5 is a fragmentary radial plan view of sections of skeleton of the type shown in FIGURES 2 and 3, assembled.

Referring now to the drawing for one illustrative embodiment of the system of this invention, reference numeral 1 indicates a rocket propulsion engine, which includes a combustion chamber 2, a throat 3 and an exit cone 4.

The throat 3 is defined by the inside surface of a liner 10. Radially outboard of the liner 10 is a honeycomb skeleton 20. In the embodiment shown, the skeleton 20 is surrounded by a cushioning blanket 30. A load-carrying structure, in the form of a casing 40 embraces the cushioning blanket 30, skeleton 20 and liner 10. The casing 40 is bolted to the body of the rocket engine 1. The exit cone 4 is bolted to the axially opposite end of the casing 40.

The liner 10 is self-supporting. In the embodiment shown, the body of the liner 10 is made of graphite, faced on its inside surface with a thin layer 11 of erosion-resistant material. In the oxygen difluoride-diborane system described in this illustrative embodiment, an oxide of tantalum or hafnium may be used as the coating 11.

In the embodiment illustrated, the liner is provided with a multiplicity of radially directed passages 13, of small diameter, drilled in a particular pattern, as will be explained hereinafter.

The radially outer surface of the liner 10 is stepped, to form ledges 15 and risers 16.

The skeleton 20 of this embodiment, is made up of a multiplicity of circumferentially extending rings 21, each of which is made up of a plurality of graphite segments 23. Each of the segments 23 in a single ring 21 can be the same. All of the segments 23 have the same outside diameter, when the segments are assembled and the rings are mounted on the liner, as shown particularly in FIGURE 1. The inside diameters of the separate rings, hence the radial thickness of the segments, varies from ring to ring, to fit the contours of the radially outer surface of the liner.

It can be seen that, because of the provision of the ledges 15, the inside surface of each of the segments can be parallel with the outside, the latter of which form, when the skeleton is assembled, a straight cylinder.

Each of the segments 23 has a flat, axially thin body 24 and a plurality of radially extending axially projecting ribs 25 on one face. The channels defined between the successive ribs 25 and the body 24, are filled with a thermal element 50 of this invention.

In the illustrative embodiment described, the thermal element consists essentially of ammonium fluoborate, to the extent of about 80% by weight, and a thermally conductive matrix consisting of 15% zirconia (zirconium oxide) and 5% graphite flakes.

In making up the thermal element, the ammonium fluoborate is thoroughly mixed with the zirconia binder and graphite, to give a uniformly distributed mixture, and packed into intimate contact with the surfaces defining the thermal element-holding channels of the rings.

Alumina can be used instead of zirconia, both being good conductors of heat at high temperatures, and both being dimensionally stable at the temperatures met, an important consideration.

It is particularly important that the heat conductive element, e.g., zirconia and graphite, be distributed throughout the mass, and that the thermal elements be in close contact with the heat-conductive surfaces of the skeleton. To this end, an especially suitable matrix has been found to include a foamable binder, for example silicone rubber or polyurethane. Such a formulation could be 10% alumina or zirconia, 5% graphite and 5% polyurethane. The polyurethane is caused to "foam" in situ. Due to the compression of the material in the skeleton, less than 3% total void is produced throughout the mass, but the material is more tightly packed against the surfaces of the skeleton than it otherwise would be, and maintains that condition in use. The graphite can take forms other than flakes, i.e. powder, small shapes.

The significance of the use of the well-distributed heat conductive matrix which retains its structure and dimensional stability as the solid sublimating or gasifying (state changing) composition is converted to the gaseous form is that without this matrix, the state-changing composition recedes first from the heat-conducting surfaces of the liner and skeleton, and is then insulated from those surfaces by the very gas which is being produced, leading to a loss of efficiency which makes the arrangement impractical. Thus with the dimensionally stable matrix, not only is the state-changing composition supplied with heat uniformly but the liner and skeleton are cooled and supported.

The heat-conducting, dimensionally stable matrix not only conducts heat from the surfaces of the skeleton and liner, but prevents physical dislodgement of the state-changing material as that material is consumed, producing an orderly consumption of the material and making it possible to stop and restart the process effectively.

It can be seen that the passages 13 must communicate with the cells of the skeleton. To that end, the skeleton rings are located, as by small pins 35, fixed in the liner and projecting radially outwardly to fit into small locating holes in the inner axial wall of the ring segments. The passages 13 are then arranged to communicate only with the cells and not with the inner surface of the ring segments. It can be seen that if a uniformly gas-permeable sintered metal or ceramic liner were used, such an arrangement would be unnecessary, since no passages would have to be drilled.

In FIGURE 8 an illustrative example of thermal-structural device of this invention applied to an aerodynamic surface is illustrated. In that figure, a liner 110 constitutes the aerodynamic surface, behind which is a honeycomb skeleton 120 backed in turn by a supporting casing 140. The liner 110 is perforated in such a way as to provide passages for gas from state-changing composition in thermal elements 150 which fill the honeycomb skeleton 120.

In this embodiment, it is desirable that the thermal element includes a material which provides, upon gasification, and in some instances, subsequent ionization, a radiation-opaque gas. This gas, which can be a product of the main state-changing composition or of a separate ingredient, generally mixed with the main state-changing composition and matrix, such as decomposable salts of sodium or cesium, or lithium hydride or another metal hydride of this class, shields the surface from radiation.

Suitable state-changing compositions will occur to those skilled in the art for various applications of this invention. An exceptionally satisfactory composition for use in rocket nozzle cooling, particularly with liquid fuels such as hydrogen-oxygen, hydrogen-fluorine, oxygen difluoride-diborane, oxygen difluoride-pentaborane, and nitrogen tetroxide-hydrazine systems, is ammonium fluoborate. It can also be used for cooling aerodynamic surfaces and the like. Molybdenum hexacarbonyl is another excellent state-changing composition. Other examples of state-changing compositions suitable for use in various applications of this invention are to be found in Feldman, U.S. Patent No. 3,022,190.

Numerous variations in the elements of this invention, within the scope of the accompanying claims, will occur to those skilled in the art in the light of the foregoing disclosures.

Merely by way of example, an egg-crate structure can be used in lieu of a honeycomb, and a porous metal liner rather than a perforated liner. The liner may be made of various other materials besides pure graphite or porous metal, depending upon the application to which it is to be put, such, for example, as silica-phenolic, graphite-phenolic, and graphite-epoxy compositions, which may similarly be used for the skeletal structure. Common to all forms and variations, however, is the use of the heat conducting, dimensionally stable matrix which remains in contact with the surfaces of the heat conducting skeleton.

Having thus described the invention, what is claimed and desired to be secured by Letters Patent is:

1. A thermal-structural system comprising a gas permeable liner; a cellular load and heat transmitting skeleton the cells of which communicate with said liner; a thermal element within and in intimate contact with the walls of the cells of said skeleton, said thermal element including a heat-conductive matrix and a sublimating composition, said heat-conductive matrix being distributed throughout said thermal element, engaging the walls of said skeleton, and being substantially stable dimensionally in use and said sublimating composition subliming at a temperature lower than the expected temperature to be attained by the said skeleton adjacent the liner, to form a gaseous sublimate which decomposes endothermically at a temperature lower than that expected to be reached by said liner; and a load-carrying structure backing said skeleton.

2. A thermal-structural system comprising a gas-permeable liner, a cellular load and heat transmitting skeleton selectively mountable and demountable on said liner, said skeleton being made up of a plurality of self-supporting wedge shaped, open faced sections in side by side relationship circumferentially and face to back relationship axially, the cells of each of said sections being defined by radially extending ribs projecting axially from a flat face, each of said cells communicating with said liner; a thermal element including a heat-conductive matrix and a sublimating composition within the cells of said skeleton, said heat-conductive matrix being distributed throughout said thermal element, engaging the walls of the cells, and being substantially stable dimensionally in use, said sublimating composition subliming at a temperature lower than the expected temperature to be attained by the said skeleton adjacent the liner, to form a gaseous sublimate which decomposes endothermically at a temperature lower than that expected to be reached by said liner; and a load-carrying structure backing said skeleton.

3. The system of claim 2 wherein the liner is cylindrical in transverse cross section; the sections of skeleton are segments of a circle and the ends thereof are staggered with respect to contiguous segments axially of the liner.

4. A thermal structural system comprising a gas permeable liner; a cellular load and heat transmitting skeleton the cells of which communicate with said liner; solid gasifying composition in a heat conductive matrix within the cells of said skeleton, said gasifying composition gasifying at a temperature lower than the expected temperature to be attained by the skeleton adjacent the liner; to form a gaseous substance which decomposes endothermically at a temperature lower than that expected to be reached by said liner, and said matrix including graphite and a binder taken from the group consisting of zirconia and alumina, said matrix being dimensionally stable at the temperature of gasification of said gasifying composition; and a load-carrying structure backing said skeleton.

5. The system of claim 4 wherein the matrix includes a foamable material.

6. A thermal structural system comprising a gas permeable liner, said liner being made of graphite and being coated on its surface facing a source of intense heat with an erosion-resistant material taken from the group consisting of tantalum oxide and hafnium oxide; a cellular load and heat transmitting skeleton the cells of which communicate with said liner; a thermal element within and in intimate contact with the walls of the cells of said skeleton, said thermal element including a heat-conductive matrix and a sublimating composition, said heat-conductive matrix being distributed throughout said thermal element, engaging the walls of said skeleton and being substantially stable dimensionally in use and said sublimating composition subliming at a temperature lower than the expected temperature to be attained by the said skeleton adjacent the liner, to form a gaseous sublimate which decomposes endothermically at a temperature lower than that expected to be reached by said liner; and a load-carrying structure backing said skeleton.

7. A thermal structural system comprising a gas permeable liner, a cellular load and heat transmitting skeleton the cells of which communicate with said liner, and a thermal element within and in intimate contact with the walls of the cells of said skeleton, said thermal element including a heat conductive matrix and a state-changing composition, said state-changing composition gasifying at a predetermined temperature and said heat-conductive matrix including graphite and a binder taken from the group consisting of zirconia and alumina, and being dimensionally stable at said gasifying temperature.

8. A thermal structural system comprising a gas-permeable liner, a cellular load and heat transmitting skeleton the cells of which communicate with said liner, and a thermal element within and in intimate contact with the walls of the cells of said skeleton, said thermal element including a heat-conductive matrix, a foamed and set polymeric material, and a state-changing composition gasifying at a predetermined temperature and said heat-conductive matrix being dimensionally stable at said gasifying temperature.

References Cited by the Examiner

UNITED STATES PATENTS

| | | | |
|---|---|---|---|
| 3,022,190 | 2/1962 | Feldman | 60—39.66 |
| 3,115,746 | 12/1963 | Hsia | 60—35.6 |
| 3,167,909 | 2/1965 | Thielman | 60—35.6 |
| 3,200,585 | 8/1965 | Climent et al. | 60—35.6 |

CARLTON R. CROYLE, *Primary Examiner.*

SAMUEL FEINBERG, *Examiner.*